Nov. 8, 1966 T. G. HESSELGREN 3,284,572

ELECTRIC SIGNALLING DEVICE FOR THE TRANSMISSION OF SIGNALS IN THE FORM OF PULSE TRAINS

Filed Dec. 27, 1961 2 Sheets-Sheet 1

INVENTOR.
Tore Gottfrid Hesselgren
BY
Michael S. Striker
Attorney

INVENTOR.

BY

United States Patent Office 3,284,572
Patented Nov. 8, 1966

3,284,572

ELECTRIC SIGNALLING DEVICE FOR THE TRANSMISSION OF SIGNALS IN THE FORM OF PULSE TRAINS

Tore Gottfrid Hesselgren, 1 Borensvagen, Johanneshov, Sweden

Filed Dec. 27, 1961, Ser. No. 162,499
Claims priority, application Sweden, Jan. 2, 1961, 7/61
8 Claims. (Cl. 179—5)

This invention relates to an electric signalling system for the transmission of signals consisting of one or more trains of pulses.

The system according to this invention is particularly suited to be used as a signal transmitter in systems for central supervision of a plurality of places or buildings situated remote from one another. Such systems are used e.g. for the supervision of a plurality of buildings in order to effect a signal transmission to a central supervision station in the case of fire, burglary or stops and faults in machinery located in the buildings. At the supervised places are provided detecting means, e.g. contact thermometers, contact manometers, limit switches, thermostats, photo-cell devices or other electric contact means which are so arranged that they are actuated and cause the signal transmitter to become operative when something occurs on which information should be sent to the central supervision station.

For the transmission of signals from the transmitters to the central supervision station an ordinary telephone network is often used, that is, the transmitters as well as the receiving means at the supervision station are connected by means of ordinary subscribers' lines to an automatic telephone exchange. When a transmitter in such a system is made operative, it first connects itself automatically to an outgoing telephone line and transmits over the line a code signal corresponding to the number of the receiving apparatus at the supervision station. The transmitter is hereby connected by the automatic telephone exchange to the receiver and then transmits code signals for carrying information to the receiver. The lastmentioned code signals may, for instance, indicate the identity of the transmitter and/or the nature of the fault or other condition which caused the signalling. The receiver may be provided with devices which automatically record these signals and/or alarm devices which are made operative by the received signals. The receiver may also be provided with devices which transmit automatically a return signal after the reception of the signals from the transmitter, and the transmitter may be provided with devices which are actuated by these return signals and stop the transmitter and disconnect it from the telephone line.

Thus a transmitter in a supervision system connected to an automatic telephone system must be able to transmit two kinds of signals, namely switching signals for actuating the automatic telephone exchange so that this connects the transmitter to the desired receiving station, and signals carrying information to the receiving station. The code signals which indicate the number of the receiving station, are of course the same for all transmitters belonging to one and the same system, but are different for different systems. The signals for carrying information should be different for different transmitters belonging to the same system. The number signals usually consist of trains of pulses in the form of short breaks in a line loop, while the information signals consist of pulses of an alternating voltage which is usually of audio frequency. Thus each transmitter shall be able to produce a large number of pulses in correct time sequence and with predetermined intervals between different trains of pulses, which pulses are of different kinds in each transmitter, and the number and timing of which are different in different transmitters.

It is an object of the present invention to provide a signalling device of a simple design which is capable of transmitting in a predetermined time sequence a plurality of signals, each consisting of trains of pulses, and which is provided with switching means which makes it possible to vary in a very simple way the number of pulse trains as well as the number of pulses in each train.

According to the invention the signalling device comprises a plurality of contact members and a rotatable member which is arranged to actuate said contact members during its rotation so that the contact members are caused to perform breaks and makes during predetermined time intervals during each revolution of the rotatable member. One of said contact members is adapted to effect a plurality of makes and breaks during each revolution of the rotatable member, and the other contact members are adapted to effect during each revolution of the rotatable member breaks or makes during time intervals which are different for different contact members and which fall within the time interval during which the firstmentioned contact member effects a plurality of makes and breaks. The signalling device also comprises switching means for connecting optionally any of said other contact members to one or more conductors.

The firstmentioned contact member may e.g. be connected in series with a line loop and one of the other contact members is connected by means of the switching means in parallel with the first mentioned contact member. While the rotatable member performs one revolution the first mentioned contact member effects a certain number of breaks. The other contact member connected in parallel with the first mentioned contact member effects a make during some part of the time interval during which the firstmentioned contact member effects breaks, and therefore part of these breaks will have no effect. Thus, during each revolution of the rotatable member break pulses are produced the number of which is dependent on which of said other contact members is connected to the line loop.

The invention will be described more in particular in conjunction with the accompanying drawings.

Figure 1:
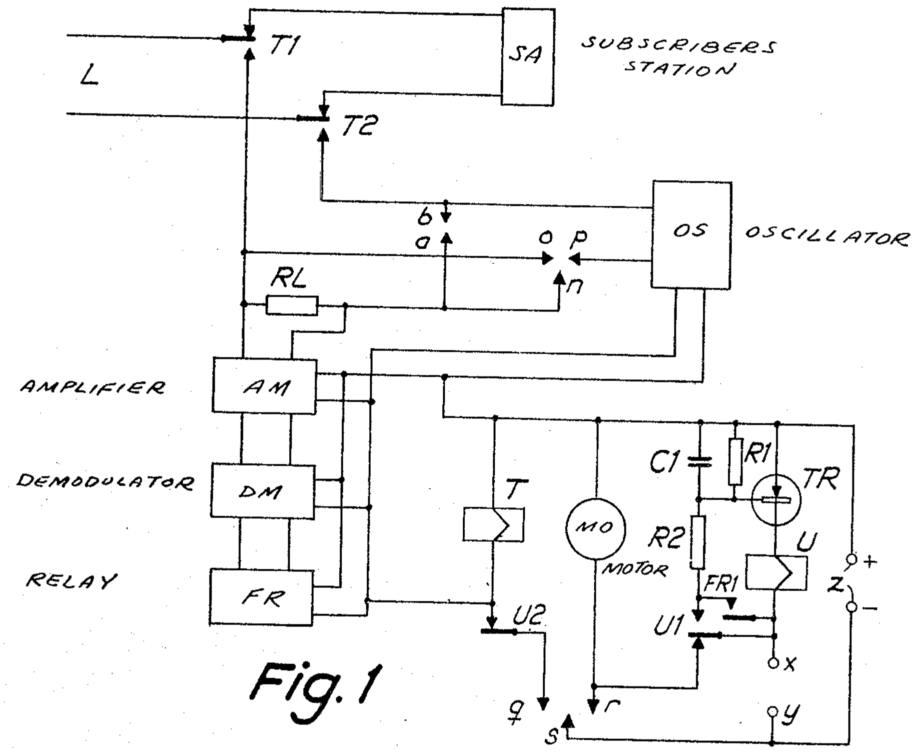
FIGURE 1 shows a circuit diagram of a transmitter including a device according to the invention.

In the system shown in FIGURE 1 a telephone line L is connected to the change-over contacts T1 and T2 of a relay T. When the system is at rest, the telephone line L is connected by these change-over contacts to an ordinary subscriber's station designated SA. The signalling device is provided with terminals $z$ for connection to a direct current source which is not shown in the figure. Furthermore, the device is provided with terminals $x$ and $y$ for connection to a detecting means which is so designed that when it is actuated it causes the closure of a circuit between terminals $x$ and $y$. The device also comprises a motor MO for driving the rotating members included in the device, and relays T and U. The collector-emitter path of a transistor TR is connected in series with the winding of relay U. The power supply and control circuits of transistor TR comprise resistors R1 and R2 and a capacitor C1.

The components mentioned above, viz motor MO, relays T and U, transistor TR and the circuits connected thereto may be considered as the power supply portion of the device. The transmitter further comprises another portion which may be called the line portion and which includes an alternating current source or oscillator OS, which generates an audio frequency alternating voltage, a load resistor RL having a resistance of e.g. 600 ohms, and an amplifier AM, a demodulator DM and a frequency sensitive relay FR. The alternating current source OS, the amplifier AM, the demodulator DM and the frequency sensitive relay FR receive the required direct current energy from terminals *z* over contacts in the power supply portion.

Relays T, U and FR actuate contacts which are designated by the same letters as the relays accompanied by different numerals.

According to the invention the transmitter further comprises contact members *a* and *b* which serve as pulsing contacts. Moreover the transmitter comprises additional contact members *n, o* and *p* in the line portion and *q, r* and *s* in the power supply portion.

The contact members *a* and *b* consist of sliding contacts which rest against a first rotatable member, and contact members *n, o, p* and *q, r* and *s* likewise consist of sliding contacts which rest against a second rotatable member. These rotatable members are provided with contact segments which are so arranged that when the respective rotatable member rotates they cause connections between the sliding contacts cooperating therewith during predetermined time intervals. The rotatable members and the members cooperating therewith will be described more in particular with reference to FIGURES 2–5.

Figure 2:
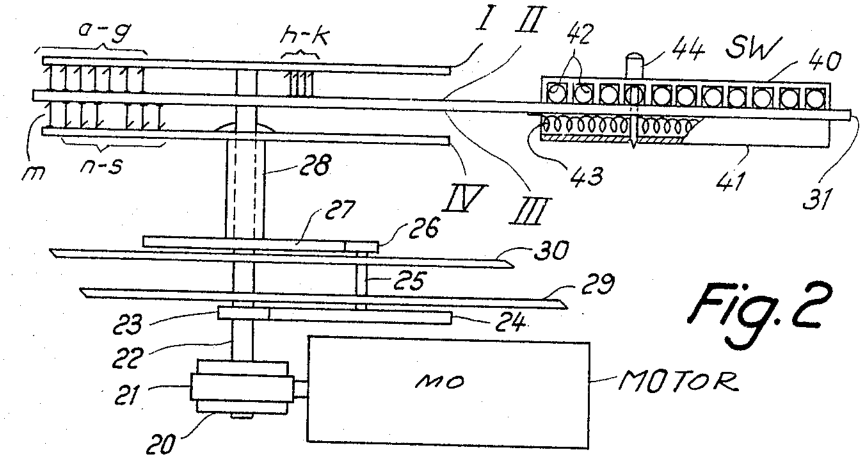
FIGURE 2 shows an embodiment of the device according to the invention.

In FIGURE 2 supporting members are designated 29, 30 and 31. The supporting members and the motor MO are attached in some suitable manner to the frame (not shown) of the device. The motor MO drives by means of a worm gear 20–21 a shaft 22. A first rotatable member I in the form of a circular disk is attached to shaft 22. Shaft 22 drives a second shaft 28, which is hollow and concentric to shaft 22. A second rotatable member IV which also consists of a circular disk, is attached to shaft 28. Shaft 28 is driven from shaft 22 by means of a gearing consisting of gear wheels 23, 24, shaft 25 and gear wheels 26, 27. The gear ratio is such that the rotational speed of disk I is an integral multiple of the rotational speed of disk IV. A suitable gear ratio between shafts 28 and 22 is e.g. 1:24.

The fixed supporting member 31 consists of a plate of insulating material. A number of sliding contacts *a–k* which rest against the bottom side of the rotating disk I, are mounted on the top side II of this plate. The bottom side III of plate 31 also carries a number of sliding contacts *n–s*, which rest against the rotatable disk IV.

The plate 31 also carries a switching device which is designated SW in FIGURE 2. This switching device comprises two sets 42 and 43 of cylindrical spiral springs which are arranged in two parallel adjacent planes in such a way that the springs of one set cross the springs in the second set preferably at right angles. The spiral springs are accommodated in grooves in insulating holders 40 and 41. The grooves have such cross sectional dimensions that they prevent the spiral springs from being laterally displaced. One holder 40 is mounted on the top side and the other holder 41 on the bottom side of plate 31. The holders 40 and 41 and plate 31 are provided with holes at the crossing points of the spiral springs belonging to the two sets. The switching device further comprises a number of pins of conductive material. One of these pins designated 44 is shown in FIGURE 2. Each pin is provided with a head at one end. When a pin is pushed into one of said holes it effects a galvanic connection between the two spiral springs crossing each other at this hole. The thickness of the pin is larger than the normal distance between two adjacent turns of the spiral springs, so that two adjacent turns of the spiral spring will always be in contact with the pin under a certain pressure when the pin is pushed into the spiral spring.

The spiral springs 42 in the upper set of springs in switching device SW are connected to sliding contacts which rest against disk I, while the spiral springs in the bottom set are connected to contact segments on the bottom side III of plate 31. Thus, any one of said sliding contacts can be connected to any one of said contact segments by means of pins 44.

Figure 3:
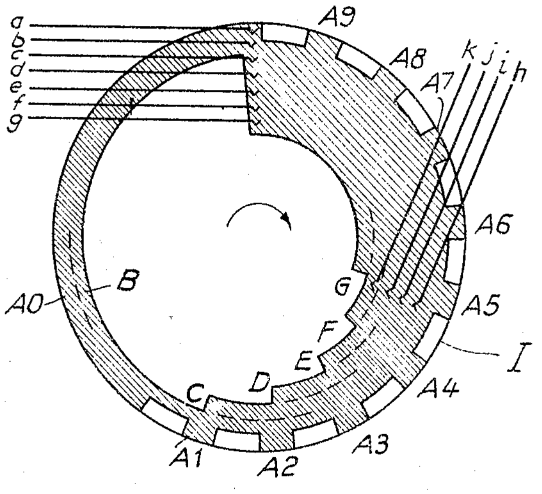
FIGURES 3–5 show details of the embodiment shown in FIGURE 2.

FIGURE 3 shows the disk I as seen from below. The disk is made of insulating material and on its bottom side it is provided with a conductive coating indicated by hatching in the figure. This conductive coating consists of a number of integral parts or sections A–G, which are located at different radial distances from the centre of the disk and have different peripheral extension. FIGURE 3 also shows the sliding contacts *a–k* which rest against disk I and which are divided into two sets *a–g* and *h–k*. The sliding contacts in each set rest against disk I at points situated on the same radius but at different distances from the centre of the disk, so that different sliding contacts in the same set of sliding contacts will come into contact with different contact sections during the rotation of the disk.

The sliding contact *a* rests against a part of disk I which is provided with a long contact section A0 and nine shorter contact sections A1–A9 which are disposed with equal spacings along the periphery. The sliding contact *b* rests against a part of the disk which is provided along the whole periphery with a conductive coating, the contact section B. If sliding contacts *a* and *b* are connected into a circuit, e.g. as shown in FIGURE 1, this circuit will be closed when disk I is in the initial position shown in FIGURE 3. If disk I rotates in the direction indicated by an arrow in the figure, the circuit will remain closed as long as sliding contact *a* slides over contact section A0. Then the circuit will be alternately and successively interrupted and closed ten times while the sliding contact *a* slides over contact sections A1–A9 and the spacings between these. Hereby ten break pulses are produced during each revolution of the disk. If some of the additional sliding contacts *c–k* are connected to the circuit at the same point as sliding contact *a*, the circuit will remain closed through sliding contact *b*, the conductive coating on disk I and the additional sliding contact during a shorter or longer time interval falling within the time interval during which sliding contact *a* slides over contact sections A1–A9 and the spacings between these. Hence in this case the number of break pulses during each revolution of disk I will be less than ten. If e.g. sliding contact *c* is connected to sliding contact *a*, only one pulse will be generated during each revolution of the disk. If sliding contact *f* is connected to sliding contact *a*, four pulses will be generated during each revolution, and if sliding contact *k* is connected to *a*, nine pulses are generated during each revolution.

In the described embodiment the disk I is assumed to rotate with a speed of one revolution in 1.6 seconds, and the contact sections A1–A9 and the intervals therebetween are so dimensioned that the break pulses will have a duration of 60 milliseconds and the closure between two successive breaks will have a duration of 40 milliseconds. These values of pulse duration and the intervals between two successive pulses are ordinary standard values for digit pulses in automatic telephone systems. The contact section A0 has such a length that during each revolution of the disk it is in contact with the sliding contact *a* during about 0.6 second.

Figures 4, 5:
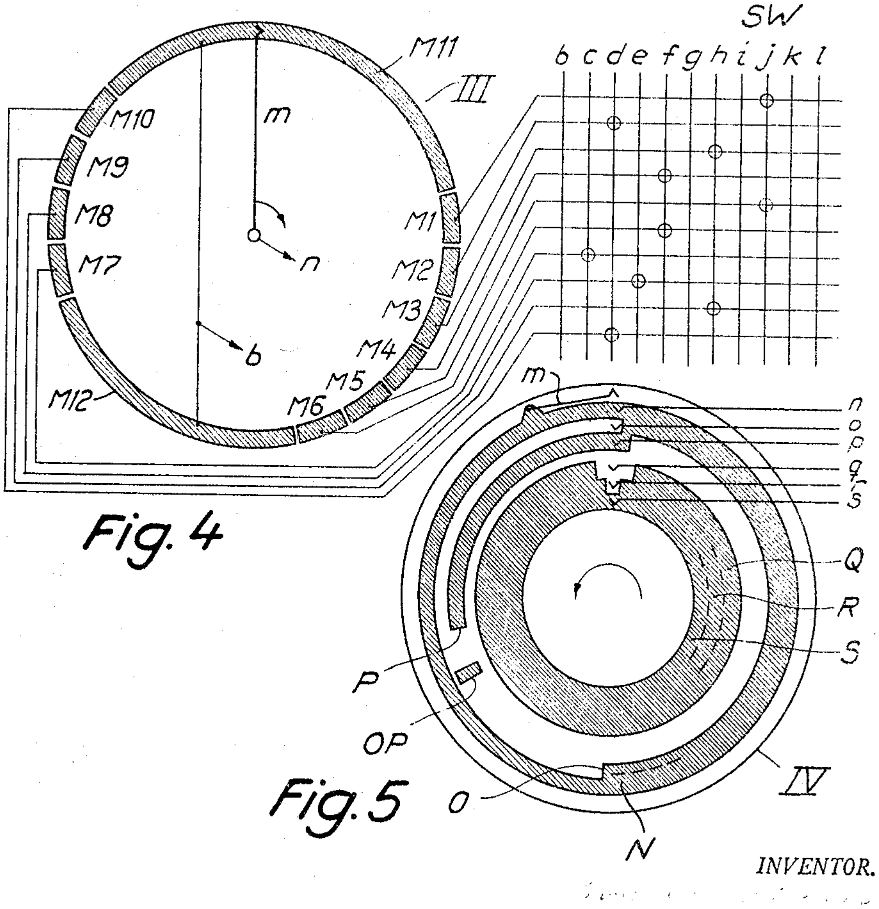

The sliding contacts *b–k* are connected to separate spiral springs in the upper set of springs in switching device SW in FIGURE 2. In FIGURE 4 the switching device SW is shown diagrammatically in the form of two sets of straight conductors crossing each other. The vertical conductors of SW in FIGURE 4 correspond to the upper set of spiral springs 42 in FIGURE 2 and the horizontal conductors in FIGURE 4 correspond to the bottom set 43 of spiral springs in FIGURE 2. In FIGURE 4 the vertical conductors are designated by the same letters as the sliding contacts to which they are connected. The horizontal conductors of SW are connected to separate ones of a number of contact segments M1–M10 which are disposed in two groups (M1–M6 and M9–M10) in a circle on the upper side III of plate 31. Between the two groups of these segments are provided two longer contact segments M11 and M12.

Some of the crossing points between the conductors of the switching device SW are marked with circles which indicate that pins 44 in FIGURE 2 are inserted in these crossing points so that the two crossing conductors in such a point are connected with each other. Thus the contact segment M1 in the shown embodiment is connected over switching device SW to the sliding contact *j*, contact segment M2 is similarly connected to sliding contact *d* etc.

A sliding contact *m* is attached to the second rotatable disk IV and is connected to a contact segment N, which extends around the whole periphery of disk IV as shown in FIGURE 5. A sliding contact *n* cooperates with contact segment N. When disk IV rotates the sliding contact *m* will slide by its free end over contact segments M on the bottom side III of plate 31. Hereby the contact segments M will be successively connected to sliding contact *n* which is connected, as shown in FIGURE 1, together with sliding contact *a* to one of the two outgoing conductors over the load resistor RL. The contact segments M1–M6 and M7–M10 are so dimensioned and disposed that the sliding contact *m* slides over one such segment while disk I performs one revolution. The long contact segments M11 and M12 in FIGURE 4 are connected to each other and to the same outgoing conductor as sliding contact *b*. When sliding contact *m* slides over segments M11 and M12 contacts *a* and *b* are therefore short-circuited irrespective of the position of disk I.

FIGURE 5 shows the second rotating disk IV as seen from above. As mentioned in connection with FIGURE 2 this disk rotates at a considerably lower speed than the first rotatable disk I. In the described embodiment the disk IV performs one revolution while disk I performs 24 revolutions. As appears from FIGURE 2 disk IV has the same direction of rotation as disk I. In FIGURES 3 and 5 the rotational direction of disks I and IV is indicated by arrows which are oppositely directed which is due to the fact that disk I is shown as seen from below while disk IV is shown as seen from above.

The contact segment N on disk IV is integral with two additional contact segments O and P disposed at different radial distances from the centre of the disk and having different extensions. Two sliding contacts *o* and *p* which cooperate with contact segments O and P rest against disk IV. As appears from FIGURE 1 sliding contact *o* is directly connected to one of the two outgoing conductors, while sliding contact *p* is connected to one terminal of the alternating current source OS. The contact segment O is so disposed and has such a length that it effects a direct connection between contacts *n* and *o* during the time when sliding contact *m* slides over contact segments M1–M6 (FIGURE 4). During this time the resistor RL (FIGURE 1) is therefore short-circuited. The contact segment P on disk IV is so disposed and dimensioned that the sliding contacts *p* and *n* are connected with each other during the time when the sliding contact *m* slides over contact segments M7–M10 (FIGURE 4). Thus during this time one terminal of alternating current source OS (FIGURE 1) is connected to one of the outgoing conductors over resistor RL. The other terminal of alternating current source OS is directly connected to the other outgoing conductor. An additional contact segment OP is provided on that part of disk IV against which sliding contacts *o* and *p* rest. A contact segment OP causes a direct connection between contacts *o* and *p* at a time within the interval during which sliding contact *m* slides over contact segment M12 (FIGURE 4). Thus contact segment OP effects a direct connection between the alternating current source OS and the outgoing conductors.

As will be seen from FIGURE 5 disk IV is provided with an additional set of contact segments Q, R and S which cooperate with sliding contacts *q*, *r* and *s* respectively. As appears from FIGURE 1 sliding contact *q* is connected to the relay contact U2, and sliding contact *r* is connected to motor MO, while sliding contact *s* is directly connected to the negative pole of the direct current source connected to terminals *z*. Contact segments Q, R and S are so designed that they effect a connection between sliding contact *s* on one hand and sliding contacts *r* and *q* on the other hand during the larger part of each revolution of disk IV. Contact segments Q and R are provided with short breaks which are so situated that the connection between sliding contact *s* and sliding contacts *q* and *r* is interrupted when disk IV is in its initial position.

When the device shown in FIGURE 1 is at rest the various relay contacts occupy the positions shown in the figure. Thus the telephone line L is directly connected to the subscriber's instrument SA over relay contacts T1 and T2. The rotatable disks I and IV are in their respective initial positions, that is, they occupy the positions shown in FIGURES 3 and 5 in relation to the sliding contacts cooperating therewith, and the sliding contact *m* carried by disk IV is then in the position shown in FIGURE 4. In the rest condition the sliding contacts *b* and *a* are short-circuited by the conductive coating on disk I as shown in FIGURE 3.

The units OS, AM, DM and FR receive no direct current in the rest condition, since the direct current feed circuit for these units comprises sliding contacts *q* and *s* between which there is no connection when disk IV is in the initial position. Nor does the motor MO receive any current when the device is at rest. In the current feed circuit of motor MO there are two parallel branches one of which comprises sliding contacts *r* and *s* and the other of which comprises the "alarm contacts" *x* and *y*.

In the initial condition transistor TR has such a bias that its collector-emitter path is non-conductive, and therefore relay U does not receive any energizing current in the rest condition.

It is now assumed that the detecting means connected to terminals *x* and *y* is actuated so that a galvanic connection is produced between these terminals. Then the following will happen:

The motor MO now receives current over terminals *x* and *y* and the relay contact U1 and starts so that disks I and IV begin to rotate. A short time after the start a connection is closed between sliding contacts *r* and *s* over contact segments R and S on disk IV, and this connection remains closed till disk IV has returned to the initial position. If the connection between *x* and *y* should be interrupted a short time after the start of the device, the motor will therefore nevertheless receive current over contacts *r* and *s* and continues to rotate till disk IV has returned to the initial position.

After an additional short time a connection is closed between sliding contacts *s* and *q* over the contact segments S and Q, whereby relay T is energized and connects by contacts T1 and T2 the telephone line L to the two outgoing conductors from the signalling device. The contacts *s* and *q* also close the direct current feed circuit for the units OS, AM, DM and FR.

The sliding contact *m* (FIGURE 4) to begin with slides over contact segment M11, and then the incoming telephone line L is short-circuited over relay contact T2, segment M11, sliding contact *m*, contact segments N and O on contact disk IV, sliding contact *o* and relay contact T1. The telephone exchange to which line L is connected now responds in the same manner as for an ordinary call and sends dialling tone to line L. The contact segment M11 has such a length that the sliding contact *m* is in engagement therewith during such a long time after the start of the device that the telephone exchange has sufficient time to respond and transmit dialling tone before the sliding contact *m* has left the segment M11.

After some seconds the sliding contact *m* enters upon contact segment M1 which is connected to sliding contact *j* over switching device SW as shown in FIG. 4. While the sliding contact *m* slides over contact segment M1 disk I performs one revolution. During the first part of the revolution the sliding contacts *a* and *b* are in connection with each other over contact segments A0 and B on disk I, and the telephone line L is then short-circuited, since at the same time the sliding contacts *o* and *n* are connected to each other over contact segments on disk IV. The sliding contact *j* is during this time in engagement with contact segment E but comes out of engagement with this segment just before the spacing between contact segments A0 and A1 enters under the sliding contact *a*. During the continued rotation of disk I the sliding contact *j* is out of engagement with the conductive coating on the disk until segment A8 enters under sliding contact *a*, when sliding contact *j* comes again into engagement with contact segment E. When then the spacings between segments A8 and A9 and A9 and A0 slide under the contact *a*, contacts *a* and *b* will again be connected to each other over sliding contact *n*, contact segment N on disk IV, sliding contact *m*, segment M1, switching device SW, sliding contact *j*, and the conductive coating on disk I, and consequently no break pulses will be generated when the two last mentioned spacings between segments A8, A9 and A0 slide under the contact *a*. On the other hand the eight first spacings between contact segments A0–A8 cause breaks in the connection between sliding contacts *b* and *a* when the sliding contact *a* slides over these spacings, and thus eight pulses will be sent over line L while the sliding contact *m* slides over segment M1. Sliding contact *m* continues to slide over segments M2–M6, and for each segment a train of pulses is sent, the number of pulses in each train being dependent on which of the sliding contacts *c–k* is connected to the respective segment over switching device SW. Thus while sliding contact *m* slides over contact segments M1–M6 six pulse trains are transmitted which represent the six-digit number of the receiving station. These pulse trains are received in known manner by the telephone exchange to which the telephone line L is connected, and in response to these pulse trains the exchange automatically connects the telephone line L to the receiving station.

According to a common code for digit dialling in automatic telephone systems the digit 0 is represented by one pulse, digit 1 by two pulses, digit 2 by three pulses etc. According to this code the switching device SW in FIGURE 4 is so set that the number 715 373 is dialled. In switching device SW there is a vertical conductor designated 1 which is not connected to any of the sliding contacts cooperating with disk I. If some of the segments M1–M6 is connected to this conductor, ten pulses (corresponding to digit 9) will be transmitted when sliding contact *m* slides over this contact segment. Since conductor 1 in switching device SW is not connected to any other conductor, it may be omitted, but switching device SW should nevertheless be provided with a row of holes corresponding to the position of conductor 1, so that the setting of digit 9 on the switching device can be effected in the same manner as the setting of any other digit, that is, by inserting a connecting pin 44 in FIGURE 2 in a corresponding hole in the switching device.

As appears from FIGURE 4 it is also possible to connect the contact segments M to the sliding contact *b* over the switching device SW. If a segment e.g. M1, is connected to sliding contact *b*, no pulses will be transmitted when sliding contact *m* slides over this contact segment. Thus it is possible to set the switching device SW for numbers in which the number of digits is less than six.

When the sliding contact *m* has left the contact segment M6 it enters upon the long contact segment M12. This is directly connected to the same outgoing conductor as contact *b*, and as long as sliding contact *m* slides over this contact segment there is thus a direct short-circuit between contacts *a* and *b*.

At the same time as sliding contact *m* enters upon contact segment M12 the connection between sliding contacts *o* and *n* is interrupted, because the contact segment 0 on disk IV comes out of engagement with sliding contact *o*. Therefore the telephone line L is no longer short-circuited but the two line conductors are connected to each other over the resistor RL (FIGURE 1).

When the sliding contact *m* has travelled over the larger part of segment M12 but before it comes into engagement with segment M7, the contact segment OP on disk IV enters under the sliding contacts *o* and *p* and thereby causes a direct connection from the oscillator OS to the telephone line L, so that an audio frequency signal is transmitted over the telephone line. It is assumed that before this signal is transmitted the telephone exchange has had time to connect the line L to the receiving station. The said signal can be used to start recording devices or the like in the receiving station.

A short time after the transmission of the said signal the sliding contact *m* enters upon contact segment M7 at the same time as the sliding contact *p* comes into engagement with contact segment P on disk IV. Hereby a connection is closed from the oscillator OS over contacts *p* and *n* and resistor RL to the telephone line L. The segment M7 is connected over the switching device SW to the sliding contact *c*. While the sliding contact *m* slides over contact segment M7, the disk I performs one revolution and causes a single break of the connection between contacts *a* and *c*. This break removes the short-circuit of the output terminals of oscillator OS so that a brief audio frequency pulse is transmitted over line L. In analogous manner a greater or less number of pulses are transmitted to the line when the sliding contact *m* slides over contact segments M8, M9 and M10. These trains of audio frequency pulses are information signals and are recorded in the receiving station and may also be utilized to operate alarm devices in the receiving station. These pulse trains may of course also be considered as representing digits, so that one pulse represents the digit 0, two pulses the digit 1, three pulses the digit 2 etc. The crossing points between the conductors in the switching device SW are preferably marked with these digits, whereby the setting of the device for transmission of desired signals is facilitated. It will be seen that if the switching device SW is set as indicated by rings at certain crossing points in FIGURE 4, the pulse trains transmitted when the sliding contact *m* slides over contact segments M7–M10 will represent the number 0251.

When the sliding contact *m* has left contact segment M10 it enters upon contact segment M11, whereby the contacts *a* and *b* are short-circuited over the circuit previously mentioned so that pulses are no longer transmitted.

A short time before the sliding contact *m* has reached its initial position, that is, before the disk IV has completed one revolution, the connection between sliding contacts *s* and *q* is interrupted whereby the relay T is de-energized and the direct current feed to the units OS, AM, DM and FR is interrupted. Furthermore, the connection between sliding contacts *s* and *r* is interrupted so that the motor MO is no longer supplied with direct current over these contacts. If, however, there is still a connection between terminals *x* and *y* the motor still receives current and continues to rotate so that the switching cycle described above is repeated. Such a repetition of the switching cycle is of course unnecessary and not desirable, if the signalling device has been connected to the receiving station and the transmitted information signals have been received and recorded in the receiving station during the first revolution of disk IV. In order to prevent such a repetition the receiving station can be provided with means for the transmission of a return signal to the transmitter when the signals received from the transmitter have been properly recorded in the receiving station. This return signal which may be called stop signal, preferably consists of a modulated high frequency signal the carrier frequency of which lies within the higher frequencies in the frequency band which can be transmitted without disturbances, while the modulating frequency preferably lies below the lowest frequency that can be transmitted. Hereby unauthorized stop signals cannot be produced by noise and disturbances in the telephone system.

In the transmitter the stop signal is passed to an amplifier AM and is demodulated in the demodulator DM. The demodulated signal is applied to the frequency sensitive relay FR, which is energized and actuates its contact FR1. When contact FR1 is closed the base electrode of transistor TR receives a negative bias, provided that there is still a connection between terminals $x$ and $y$. The said bias is produced with a certain time delay caused by the capacitor C1. This bias makes the transistor conductive so that relay U receives energizing current. Relay U actuates the change-over contact U1 so that this interrupts the current feed circuit of motor MO and closes a holding circuit for the relay. Relay U also interrupts by the break contact U2 the energizing circuit of relay T so that this relay is deenergized whereby the telephone line L is disconnected from the signalling device and instead connected again to the subscriber's instrument SA over contacts T1 and T2. The said holding circuit of relay U is interrupted when the connection between terminals $x$ and $y$ ceases, and the signalling device then returns to the initial position and is again prepared for operation.

If the connection between terminals $x$ and $y$ is interrupted before the disk IV has completed a revolution, the motor MO stops when disk IV has completed one revolution irrespective of whether said stop signal has arrived or not.

In the signalling system described above the device according to the invention is utilized to produce break pulses in a circuit which is normally closed. However, the device according to the invention can also be used for producing make pulses in a circuit which is normally open. If e.g. one conductor in a circuit is connected to sliding contact $n$ and the other conductor in the circuit is connected to sliding contact $a$ and the contact segment A0 is removed from disk I and contact segments C–G are extended somewhat so that the ends of the segments will be situated right before the spacings between contact segments A, and if sliding contacts $b$–$k$ are connected to the switching device SW in the same manner as described above, a normally open circuit is obtained in which the disk I produces make pulses when rotating.

The contact segments on disks I and IV and the part III are preferably applied to the respective surfaces by the same technique as is used for producing so-called printed circuits. The connections from the sliding contacts carried by plate 31 to the spiral springs in switching device SW also preferably consist of printed circuits.

In the described embodiment of the invention the contact members actuated by the rotatable members consist of sliding contacts and contact segments carried by the rotatable members. However, the contact members may also consist of couples of contact elements, e.g. contact springs of the type used in relays, and the rotatable member should then not be provided with contact segments but with extensions or cams which act upon one contact element in each couple of contact elements. The rotatable member with the cams can be made in one integral piece, for instance, by moulding or pressing a suitable insulation material, for instance plastics.

The said stop signal may also consist of a relatively low carrier frequency, for instance 1700 c./s., modulated by rectangular pulses having a repetition frequency of e.g. 20 pulses per second. In such case the receiving stations should be provided with signal generators for producing this signal and the signal can be applied to the line to the transmitting station, e.g. by holding a microphone of an ordinary subscriber's instrument adjacent to a loudspeaker connected to the signal generator. The modulation pulses should preferably have a duration which is less than the intervals between the pulses. Hereby the pulses are prevented from running into one another due to the reverberation which is present in microphones of the type which is commonly used for telephone purposes.

The receiving devices provided at the transmitting station for the reception of a stop signal of the last mentioned kind preferably consist of a high pass amplifier provided with means for amplitude clipping, a demodulator following the high pass amplifier, and a low pass amplifier connected to the output of the demodulator. The demodulated and amplified pulses from the output of the low pass amplifier may be rectified and are applied to a relay which stops the transmitting equipment in the manner described above.

The devices described above are given by way of example only and may be modified in many ways within the scope of the invention.

What I claim is:

1. An electrical signalling device for the automatic transmission of signals in the form of pulse trains over a transmission circuit comprising, in combination,
- a rotatable member carrying a number of contact segments which are curved concentrically about the axis of rotation of the rotatable member;
- driving means for rotating said rotatable member;
- a first sliding contact resting against a part of said rotatable member which carries a sequence of said contact segments disposed with spacings at equal radial distance from the axis of rotation of the rotatable member;
- a second sliding contact resting against a part of said rotatable member which carries a further one of said contact segments, said further contact segment being galvanically connected with all of the contact segments of said sequence of contact segments and arranged so that said second sliding contact slides over said further contact segment at the same time as said first sliding contact slides over said sequence of contact segments;
- additional sliding contacts resting against parts of said rotatable member which carry additional contact segments of different lengths galvanically connected with all the contact segments of said sequence of contact segments;
- means connecting said first and second sliding contacts into said circuit;
- and switching means for selectively connecting any of said additional sliding contacts with said first sliding contact.

2. A device as claimed in claim 1, in which at least two of said additional sliding contacts are arranged to coact with the same one of said additional contact segments, said two sliding contacts being so arranged with respect to said one additional contact segment that the sliding contacts encounter said one additional contact segment at different times during the rotation of said rotatable member.

3. An electrical signalling device for transmitting signals in the form of pulse trains over a transmission line comprising, in combination,
- a first rotatable member carrying a number of contact segments which are curved concentrically about the axis of rotation of said first rotatable member;
- driving means for rotating said first rotatable member;
- a first sliding contact resting against a part of said first rotatable member which carries a plurality of said contact segments arranged in sequence with equal spacings so that during the rotation of said first rotatable member said first sliding contact encounters successively the contact segments of said sequence and the spacings therebetween;

a second sliding contact resting against a part of said first rotatable member which carries a further one of said contact segments, said further contact segment being galvanically connected to all the contact segments of said sequence and so arranged that during the rotation of said first rotatable member said second sliding contact is in engagement with said further contact segment at the same time as said first sliding contact is in engagement with any of the contact segments of said sequence;

additional sliding contacts resting against parts of said first rotatable member which carry additional contact segments which are of different lengths and arranged at different distances from said sequence of contact segments and are galvanically connected with all the contact segments of said sequence;

means connecting said first and second sliding contacts with said line;

a fixed part carrying a plurality of contact segments of equal lengths arranged in a circle;

a rotatable sliding contact arranged to glide successively over said contact segments on said fixed part;

means connecting said rotatable sliding contact with said first sliding contact;

switching means for selectively connecting any one of said additional sliding contacts with any one of said contact segments on said fixed part; and means for rotating said rotatable sliding contact at such a rate that the movable sliding contact slides over one of said contact segments on said fixed part while said first rotatable member performs one revolution.

4. A device as claimed in claim 3, in which said switching means comprises two sets of cylindrical spiral springs of conductive material which are arranged in two parallel planes so that the spiral springs of one set cross the spiral springs of the other set, pins of conductive material, and guiding means for said pins, said guiding means being situated at the crossing points of said spiral springs so that the said pins can be inserted in said guiding means and enter both spiral springs crossing each other at the respective crossing point, thereby effecting a connection between the crossing springs.

5. A device as claimed in claim 3, connectable to a telephone line in an automatic telephone network for transmitting a first series of pulse trains for causing an automatic exchange to connect the device with a desired receiving station and a second series of pulse trains carrying information to be received by said receiving station, the pulses of said second series of pulse trains consisting of alternating current pulses; in which said contact segments on said fixed part are divided into a first and a second group, the number of contact segments in the first group corresponding to the number of pulse trains in said first series of pulse trains, and the number of contact segments in the second group corresponding to the number of pulse trains in said second series of pulse trains, the device further comprising an alternating current source, a second rotatable member arranged to be rotated in synchronism with said rotatable sliding contact, and contact means operable by said second rotatable member to connect said alternating current source to said telephone line when the rotatable sliding contact slides over said second group of contact segments.

6. A device as claimed in claim 3, in which the driving means for rotating said first rotatable member and the means for rotating said rotatable sliding contact include a common electric motor and gearing means connecting said motor with the first rotatable member and the rotatable sliding contact for imparting to the first rotatable member a rotational speed which is an integral multiple of the rotational speed of the rotatable sliding contact, and which comprises a current feed circuit for said motor, said current feed circuit having at least two parallel branches, one of said branches including contacts for starting the motor, the other of said branches including contact means controlled by a second rotatable member arranged to be rotated by said motor in synchronism with said rotatable sliding contact, said second rotatable member having contact means coacting with said contact means in said other branch of the current feed circuit of the motor to keep this branch interrupted when the second rotatable member is in an initial position and to keep said other branch closed when the second rotatable member is in other positions than said initial position.

7. A device as claimed in claim 6, in which said rotatable sliding contact is mounted on said second rotatable member and connected to a contact segment on said second rotatable member, and in which a sliding contact is provided for connecting said contact segment on said second rotatable member with said first sliding contact resting on said first rotatable member.

8. A device as claimed in claim 6, for transmitting signals over a telephone line, comprising receiving means responsive to signals of a predetermined character received over said telephone line, a break contact in series with said one branch of the current feed circuit of the motor, and contact actuating means connected to said receiving means and operable by the output from said receiving means to actuate said break contact.

References Cited by the Examiner

FOREIGN PATENTS

| | | |
|---|---|---|
| 213,530 | 2/1958 | Australia. |
| 674,357 | 6/1952 | Great Britain. |

DAVID G. REDINBAUGH, *Primary Examiner.*

E. C. MULCAHY, S. J. GLASSMAN, *Assistant Examiners.*